E. R. DURGIN.
RIM FOR EYEGLASSES AND SPECTACLES.
APPLICATION FILED FEB. 5, 1919.
1,335,942.
Patented Apr. 6, 1920.
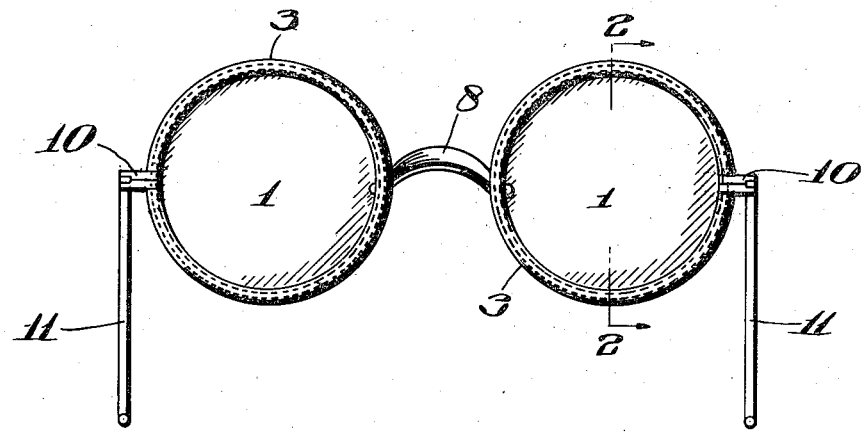
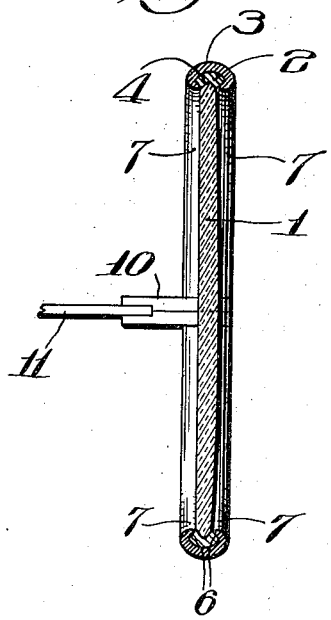
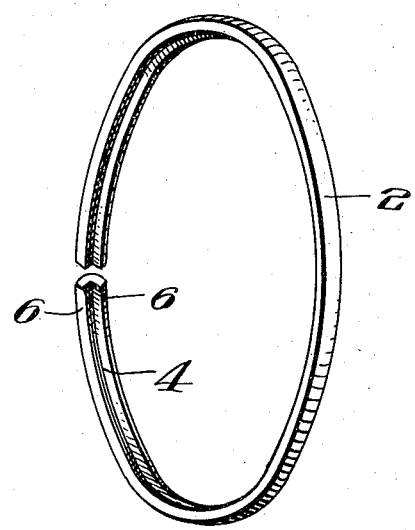
INVENTOR
Edgar R. Durgin
BY
Cyrus N. Anderson
ATTORNEY.

UNITED STATES PATENT OFFICE.

EDGAR R. DURGIN, OF NEWARK, NEW JERSEY, ASSIGNOR TO NEW JERSEY OPTICAL CO., OF NEWARK, NEW JERSEY, A CORPORATION OF NEW JERSEY.

RIM FOR EYEGLASSES AND SPECTACLES.

1,335,942.  Specification of Letters Patent.  Patented Apr. 6, 1920.

Application filed February 5, 1919. Serial No. 275,095.

*To all whom it may concern:*

Be it known that I, EDGAR R. DURGIN, a citizen of the United States, and a resident of Newark, in the county of Essex and State of New Jersey, have invented an Improvement in Rims for Eyeglasses and Spectacles, of which the following is a specification.

My invention relates to what are generally known as combination metal and non-metal rims for eyeglasses and spectacles, and it has for its object to provide a construction wherein and whereby the inner metal eye frame and the inclosing or encircling non-metal frame are more securely and firmly attached to each other than heretofore has been the case in so far as I am aware.

In order that my invention may be easily understood and its practical advantages fully appreciated, reference may be had to the accompanying drawing in which I have illustrated a preferred modification thereof.

In the drawing:

Figure 1 is a front view of a pair of spectacles, the temple wires occupying the position occupied by them when the spectacles are in use;

Fig. 2 is a transverse, sectional view taken on the line 2—2 of Fig. 1; and

Fig. 3 is a perspective view of the inner metallic eye wire.

Referring to the drawing:—1 designates the lenses of a pair of spectacles, 2 the metallic eye wire for engaging and holding the lenses, and 3 the outer non-metal frame of the rim which encircles and incloses the inner eye wire as shown. The inner edge of the eye wire is provided with a groove 4 in which the peripheral, correspondingly shaped edges of the lenses are seated.

The opposite side edges of the metal eye wire are beveled or inclined transversely as indicated at 6 to meet the intermediate peripheral surface of said wire in circular lines and form therewith angles as shown in Fig. 2. The surface of the groove in the inner side of the outer rim 3 of xylonite or other suitable non-metallic material conforms to the peripheral and beveled surfaces of the metallic eye wire, whereby the surfaces 7 of said groove conform to and contact with the surfaces 6 upon the said eye wire. The members 2 and 3, by means of the angular relation of the surfaces 6 to the intermediate peripheral surface of the eye wire 2 and of the corresponding angular relation between the surfaces 7 and the intermediate portion of the surface of the groove in the inner side of the member 3, the surfaces of the groove inclosing and overlying the surfaces of the eye wire, are firmly interlocked and secured together. 8 designates a bridge of usual construction, the opposite ends of which are secured to the metallic eye wire 2.

The end pieces 10 to which the temple wires 11 are fastened are secured at their innner ends to the adjacent, opposing ends of the metallic eye wire by soldering or otherwise as may be desired.

It will be seen that I have produced a construction of rim for eyeglasses and spectacles in which the metal and non-metal parts are firmly and permanently secured together in such manner that screws or other means for securing the non-metallic rim portion 3 to the eye wire 2 or to the end pieces 10 are unnecessary. By this means a very simple and neat construction of eyeglass or spectacle rim is produced most economically.

I claim:

1. A rim for eyeglasses and spectacles, comprising an inner metal eye wire having a groove to receive and hold the edge of a lens, the opposite sides of the said eye wire on opposite sides of said groove being beveled inwardly forming surfaces which meet the intermediate peripheral surface in circular lines and form angles therewith, and an outer non-metal frame member having a groove upon its inner side in which said metal frame member is situated, the opposite side portions of said non-metal member extending inwardly over the beveled surfaces of said eye wire, substantially as described.

2. A rim for eyeglasses and spectacles, comprising an eye wire having a groove upon its inner side for the reception of the edge of a lens, the opposite sides of said eye wire upon opposite sides of said groove being beveled inwardly to form transversely inclined surfaces, and a xylonite outer rim member having a groove in its inner side in which the said eye wire is seated and the surface of which conforms to and fits against and is interlocked with the outer surface of said eye wire.

3. A rim for eyeglasses and spectacles, comprising an eye wire having a groove in its inner peripheral side for the reception of the edge of a lens, the opposite sides of said eye wire upon opposite sides of said groove being beveled inwardly to form transversely inclined surfaces which surfaces form angles with the intermediate peripheral surface of said eye wire, and a non-metallic outer rim member having a groove in its inner peripheral side in which the said eye wire is seated, the opposite side surfaces of said groove being inclined transversely and forming angles with the intermediate bottom surface of said groove, and the surface of said groove conforming to and interlocking with the surface of the said eye wire, outside of the groove therein for holding the edges of the lens.

In testimony that I claim the foregoing as my invention, I have hereunto set my hand this 3rd day of February, A. D. 1919.

EDGAR R. DURGIN.